(12) United States Patent
Wang et al.

(10) Patent No.: US 9,587,097 B2
(45) Date of Patent: Mar. 7, 2017

(54) BLOW MOLDED ARTICLE WITH GOOD MECHANICAL AND OPTICAL PROPERTIES

(71) Applicant: Borealis AG, Vienna (AT)

(72) Inventors: Jingbo Wang, Linz (AT); Katja Klimke, Linz (AT); Petar Doshev, Linz (AT); Tung Pham, Bregenz (AT)

(73) Assignee: Borealis AG (AT)

( * ) Notice: Subject to any disclaimer, the term of this patent is extended or adjusted under 35 U.S.C. 154(b) by 0 days.

(21) Appl. No.: 15/104,489

(22) PCT Filed: Dec. 18, 2014

(86) PCT No.: PCT/EP2014/078439
§ 371 (c)(1),
(2) Date: Jun. 14, 2016

(87) PCT Pub. No.: WO2015/091780
PCT Pub. Date: Jun. 25, 2015

(65) Prior Publication Data
US 2016/0312020 A1    Oct. 27, 2016

(30) Foreign Application Priority Data
Dec. 18, 2013  (EP) .................................... 13198115

(51) Int. Cl.
| | | |
|---|---|---|
| *C08L 23/14* | (2006.01) | |
| *B29C 49/00* | (2006.01) | |
| *B29C 49/04* | (2006.01) | |
| *B29K 23/00* | (2006.01) | |
| *B29K 105/00* | (2006.01) | |
| *B29L 31/00* | (2006.01) | |

(52) U.S. Cl.
CPC ........ *C08L 23/142* (2013.01); *B29C 49/0005* (2013.01); *B29C 49/04* (2013.01); *B29K 2023/14* (2013.01); *B29K 2105/0094* (2013.01); *B29L 2031/7158* (2013.01); *C08L 2203/10* (2013.01); *C08L 2205/025* (2013.01)

(58) Field of Classification Search
CPC ............... C08L 23/142; C08L 2203/10; C08L 2205/025; B29C 49/0005; B29C 49/04; B29K 2023/14; B29K 2105/0094; B29L 2031/7158
See application file for complete search history.

(56) References Cited

FOREIGN PATENT DOCUMENTS

| EP | 0887379 A1 | 12/1998 |
|---|---|---|
| EP | 2508562 A1 | 10/2012 |
| EP | 1849826 B1 | 3/2013 |
| EP | 1741725 B1 | 4/2014 |
| WO | 9212182 A1 | 7/1992 |
| WO | 9924478 A1 | 5/1999 |
| WO | 9924479 A1 | 5/1999 |
| WO | 0068315 A1 | 11/2000 |
| WO | 0148034 A2 | 7/2001 |
| WO | 03051934 A2 | 6/2003 |
| WO | 04000899 A1 | 12/2003 |
| WO | 2004111095 A1 | 12/2004 |
| WO | 2006069733 A1 | 7/2006 |
| WO | 2009019169 A1 | 2/2009 |
| WO | 2013079457 A1 | 6/2013 |
| WO | 2013092624 A1 | 6/2013 |

OTHER PUBLICATIONS

Zweifel, Dr. Hans, Plastics Additives Handbook, 5th Edition 2001.
Zhou, Zhe, et al. "A new decoupling method for accurate quantification of polyethylene copolymer composition and triad sequence distribution with 13C NMR", Journal of Magnetic Resonance 187 (2007) 225-233.
Busico, Vincenzo, et al., "ALK-1-ENE Polymerization in the Presence of a Monocyclopentadienyl Zirconium(IV) Acetamidinate Catalyst: Microstructural and Mechanistic Insights", Macromol. Rapid Commun. 2007, 28, 1128-1134.
Cheng, H.N., "13C NMR Analysis of Ethylene-Propylene Rubbers", Macromolecules 1984, 17, 1950-1955.
Resconi, Luigi, et al., "Selectivity in Propene Polymerization With Metallocene Catalysts", Chem. Rev. 2000, 100, 1253-1345.
Wang, Wen-Jun, et al., "Structural Analysis of Ethylene/Propylene Copolymers Synthesized With a Constrained Geometry Catalyst", Macromolecules 2000, 33, 1157-1162.
Resconi, et al., Chemical Reviews, 2000, vol. 100, No. 4.
Pasquini, Nello, Polypropylene Handbook, 2nd Edition, 2005.
Galli, P., et al., "Technology: Driving Force behind innovation and growth of polyolefins", Prog. Polym Sci. 26 (2001) 1287-1336.
Resconi, et al., Propene Polymerization with Mettalocene, Chemical Reviews, 2000, vol. 100, No. 4.
Japanese Office Action dated Jan. 29, 2010.

*Primary Examiner* — Michael C Miggins
(74) *Attorney, Agent, or Firm* — Tarolli, Sundheim, Covell & Tummino LLP

(57) ABSTRACT

Blow molded article comprising a propylene copolymer having a MFR$_2$ (230° C.) in the range of more than 2.0 to 12.0 g/10 min, a comonomer content in the range of 4.0 to below 4.0 mol.-%, a melting temperature in the range of 125 to below 143° C., and a xylene cold soluble fraction (XCS) in the range of above 15.0 to 40.0 wt.-%.

17 Claims, No Drawings

BLOW MOLDED ARTICLE WITH GOOD MECHANICAL AND OPTICAL PROPERTIES

The present invention is directed to a new blow molded article comprising a propylene copolymer (R-PP) and the use of a propylene copolymer (R-PP) to improve the impact-stiffness-balance and/or the bottle appearance factor of a blow molded article.

It is well known in the polymer field that different applications require specifically tailored polymers to achieve the individual demanding properties. For instance a polymer used for injection molding must necessarily have other properties as a polymer used for blow molding.

The blow molding process for instance, like the extrusion blow molding process or the injection stretch blow molding process, is a very special process that allows in a flexible and cheap way the preparation of different kind of bottles with respect to size and shape. Main drawback in this process is that the solidification step is very special compared to normal injection molding processes.

In the extrusion blow molding (EBM) process a polymer melt is first extruded through a tubular die into air forming a polymer tube, subsequently blowing up said polymer tube (typically called "parison" in this technical field) until the outside of the tube reaches the boundaries of the mold. To cover the wall of the mold fully with the blown up polymer tube is rather difficult compared to injection molding because the air between polymer tube and mold has to be removed totally which is a demanding process step. Further the inside of the polymer tube is not in contact with the mold and therefore there is only little possibility to influence the inner surface structure of the tube. As a consequence thereof extrusion blown molded articles, like bottles, normally show inferior optical properties compared to any injection molded articles. For instance, the surface property inside and/or outside of extrusion blown bottles is typically non-uniform (flow lines, melt fracture) leading to lower overall gloss and transparency compared to injection molded bottles. An alternative blow molding process it the injection stretch blow molding (ISBM) process, where a preform is produced by injection molding followed by stretching and blowing the preform until the outside of the preform reaches the boundaries of the mold. The same problems as for extrusion blow molding process (EBM) occur also at the ISBM process. This leads for instance, that the surface property inside and/or outside of injection stretch blown moulded bottles is typically non-uniform (flow lines, melt fracture) leading to lower overall gloss and transparency compared to injection molded bottles Furthermore, it has become clear in the meantime that gloss or transparency should not be the only values to be used for judging the quality of the optical properties of blow molded (EBM) articles. For instance it has been recognized that the visual appearance of blow molded articles, like extrusion blow molded articles, is inacceptable even though the gloss values have been rather high. Thus, it became clear that the gloss values alone were not enough to judge the optical appearance of the bottles and hence a new parameter, the so-called bottle appearance factor (BAF), which is defined as BAF=(clarity*gloss)/haze, has been introduced. In this context, it is further to be noted that blow molded articles, like extrusion blow molded articles, like bottles, must fulfil all the strict regulations (Pharmacoppoeia and FDA) governing blow, fill and seal applications if they are considered for the healthcare market. One requirement for blow molded articles, as extrusion blow molded articles, is that they are sterilisable. That means, that is important that the blow molded articles, as extrusion blow molded articles, have a rather high melting temperature in order to withstand the sterilization process without deterioration of the optical appearance.

Furthermore, the blow molded articles, like extrusion blow molded articles, shall have a high impact strength as this prevents damages caused by fallings from rather high altitudes and allow to broaden the application area and to use less material during production, which results in a reduced $CO_2$ footprint.

Further also high flowability of the used polymer is desired to reduce the production costs. Unfortunately high flowability is normally paid with loss in mechanical priorities, like impact strength.

Accordingly, there is still a demand for blow molded articles, like extrusion blow molded articles, having an improved bottle appearance factor (BAF) and a good impact behavior and which can be produced in an economical way, i.e. with rather low melt pressure.

Thus, the object of the present invention is to provide a blow molded article, like an extrusion blow molded article, having an improved bottle appearance factor (BAF) and a good impact behavior.

The finding of the present invention is to provide a blow molded article, like an extrusion blow molded article, comprising a propylene copolymer with regular insertion of the comonomer into the polymer chain by keeping the overall comonomer content in a specific range. Preferably the molecular weight distribution of the used propylene copolymer is rather broad.

Accordingly, the present invention is directed to a blow molded article, as an extrusion blow molded article, comprising a propylene copolymer (R-PP), wherein the blow molded article, as the extrusion blow molded article, and/or the propylene copolymer (R-PP) has/have (a) a melt flow rate $MFR_2$ (230° C.) measured according to ISO 1133 in the range of more than 2.0 to 12.0 g/10 min,
(b) a comonomer content in the range of 4.0 to below 14.0 mol.-%,
(c) a melting temperature in the range of 125 to below 143° C., and
(d) a xylene cold soluble fraction (XCS) in the range of above 15.0 to 40.0 wt.-%.

It has surprisingly been found that such a blow molded article, like extrusion blow molded article, has a very good impact behavior as well as an improved bottle appearance factor (BAF) of the blow molding article, like the extrusion blow molded (EBM) article.

In the following the invention is defined in more detail.

First the propylene copolymer (R-PP) being part of the inventive blow molded article, like the extrusion blow molded article, is described in more detail.

The propylene copolymer (R-PP) according to this invention is preferably monophasic.

Accordingly it is preferred that the propylene copolymer (R-PP) does not contain elastomeric (co)polymers forming inclusions as a second phase for improving mechanical properties. A polymer containing elastomeric (co)polymers as insertions of a second phase would by contrast be called heterophasic and is preferably not part of the present invention. The presence of second phases or the so called inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

Accordingly it is preferred that the propylene copolymer (R-PP) according to this invention has no glass transition temperature below −30, preferably below −25° C., more preferably below −20° C.

On the other hand, in one preferred embodiment the propylene copolymer (R-PP) according to this invention has a glass transition temperature in the range of −12 to +2° C., more preferably in the range of −10 to +2° C.

Further the propylene copolymer (R-PP) has a melting temperature of at least 125° C., more preferably in the range of 125 to below 143° C., still more preferably in the range of 128 to 142° C., like in the range of 129 to 140° C.

Additionally it is appreciated that the propylene copolymer (R-PP) has a crystallization temperature ($T_c$ of at least 88° C., more preferably of at least 90° C. Accordingly the inventive propylene copolymer (R-PP) has preferably a crystallization temperature ($T_c$ in the range of 88 to 110° C., more preferably in the range of 90 to 105° C.

The propylene copolymer (R-PP) according to this invention has a melt flow rate $MFR_2$ (230° C.) measured according to ISO 1133 in the range of more than 2.0 to 12.0 g/10 min, more preferably in the range of 2.5 to 11.5 g/10 min, still more preferably in the range of 3.0 to 10.0 g/10 min, even more preferably in the range of 3.5 to 8.0 g/10 min, like in the range of 4.0 to 6.0 g/10 min.

The xylene soluble content can be in a rather broad range. Accordingly it is preferred that the propylene copolymer (R-PP) has a xylene cold soluble fraction (XCS) in the range of 15.0 to 40.0 wt.-%, preferably in the range of 18.0 to 35.0 wt.-%, more preferably in the range of equal or more than 22.0 to 30.0 wt-%.

Further it is preferred that the propylene copolymer (R-PP) has a hexane soluble content of below 8.0 wt.-%, more preferably in the range of above 1.5 to below 8.0 wt.-%, still more preferably in the range of 2.0 to 5.0 wt.-%.

The propylene copolymer (R-PP) comprises apart from propylene also comonomers. Preferably the propylene copolymer (R-PP) comprises apart from propylene ethylene and/or $C_4$ to $C_{12}$ α-olefins. Accordingly the term "propylene copolymer" according to this invention is understood as a polypropylene comprising, preferably consisting of, units derivable from
(a) propylene
and
(b) ethylene and/or $C_4$ to $C_{12}$ α-olefins, preferably ethylene.

Thus the propylene copolymer (R-PP) according to this invention comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the propylene copolymer (R-PP) according to this invention comprises, especially consists of, monomers copolymerizable with propylene from the group consisting of ethylene, 1-butene and 1-hexene. More specifically the propylene copolymer (R-PP) of this invention comprises—apart from propylene—units derivable from ethylene and/or 1-butene. In a preferred embodiment the propylene copolymer (R-PP) according to this invention comprises units derivable from propylene and ethylene only.

Additionally it is appreciated that the propylene copolymer (R-PP) preferably has a comonomer content in a very specific range which contributes to the impact strength and the good optical properties. Thus it is required that the comonomer content of the propylene copolymer (R-PP) is in the range of 4.0 to 14.0, preferably in the range of 5.0 to 13.5 mol.-%, more preferably in the range of 5.5 to 13.0 mol.-%, still more preferably in the range of 6.0 to 12.5 mol.-%, yet more preferably in the range of 6.5 to below 12.0 mol.-%, still yet more preferably in the range of equal or more than 7.0 to 11.5 mol.-%.

Preferably the propylene copolymer (R-PP) is featured by a rather broad molecular weight distribution. The molecular weight distribution can be determined by Gel Permeation Chromatography or by shear viscosity. Accordingly it is preferred that the propylene copolymer (R-PP) has
(a) a molecular weight distribution (Mw/Mn) of at least 2.7, more preferably in the range of 2.7 to 4.5, still more preferably in the range of 2.8 to 4.0, like in the range of 2.8 to 3.7;
and/or
(b) a polydispersity index (PI) of at least 2.3, more preferably in the range of 2.3 to 3.5, still more preferably in the range of 2.4 to 3.2, like in the range of 2.5 to 3.0.

Preferably the propylene copolymer (R-PP) according to this invention has been produced in the presence of a metallocene catalyst. The catalyst influences in particular the microstructure of the polymer. In particular, polypropylenes prepared by using a metallocene catalyst provide a different microstructure compared to polypropylenes prepared by using Ziegler-Natta (ZN) catalysts. The most significant difference is the presence of regio-defects in metallocene-made polypropylenes. These regio-defects can be of three different types, namely 2,1-erythro (2,1e), 2,1-threo (2,1t) and 3,1 defects. A detailed description of the structure and mechanism of formation of regio-defects in polypropylene can be found in Chemical Reviews 2000, 100(4), pages 1316-1327. By introducing defects into the polymer chain, such as comonomers, stereo-errors or regio-defects, the physical properties of polypropylene can be modified. In particular, by increasing the amount of chain defects, crystallinity and melting point of polypropylene can be reduced.

The term "2,1 regio defects" as used in the present invention defines the sum of 2,1 erythro regio-defects and 2,1 threo regio-defects.

Accordingly it is preferred that the propylene copolymer (R-PP) according to this invention has 2,1 regio-defects, like 2,1 erythro regio-defects, of at least 0.1%, more preferably of at least 0.2%, still more preferably in the range of 0.2 to 4.0%, determined by $^{13}$C-NMR spectroscopy. For example, the propylene copolymer (R-PP) of the instant invention has 2,1 regio-defects, like 2,1 erythro regio-defects, of from 0.4 to 2.0%, determined by $^{13}$C-NMR spectroscopy.

The propylene copolymer (R-PP) preferably comprises at least two polymer fractions, like two or three polymer fraction, all of them being propylene copolymers. Preferably the random propylene copolymer (R-PP) comprises at least two different propylene copolymer fractions, like two different propylene copolymer fractions, wherein further the two random propylene copolymer fractions differ in the comonomer content and/or in the melt flow rate $MFR_2$ (230° C.), preferably differ in the comonomer content and in the melt flow rate $MFR_2$ (230° C.).

Preferably one fraction of the two polymer copolymer fractions of the propylene copolymer (R-PP) is the comonomer lean fraction and the other fraction is the comonomer rich fraction, wherein more preferably the lean fraction and the rich fraction fulfill together inequation (I), more preferably inequation (Ia), still more preferably inequation (Ib), $$\frac{Co \text{ (rich)}}{Co \text{ (lean)}} \geq 2.0, \tag{I}$$

$$2.0 \le \frac{Co \text{ (rich)}}{Co \text{ (lean)}} \le 10.0, \quad \text{(Ia)}$$

$$3.0 \le \frac{Co \text{ (rich)}}{Co \text{ (lean)}} \le 8.0 \quad \text{(Ib)}$$

wherein

Co (lean) is the comonomer content [mol.-%] of the propylene copolymer fraction with the lower comonomer content, Co (rich) is the comonomer content [mol.-%] of the propylene copolymer fraction with the higher comonomer content.

In addition or alternatively to inequation (I) one fraction of the two polymer copolymer fractions of the propylene copolymer (R-PP) is the low melt flow rate MFR$_2$ (230° C.) fraction and the other fraction is the high melt flow rate MFR$_2$ (230° C.) fraction, wherein more preferably the low flow fraction and the high flow fraction fulfill together inequation (II), more preferably inequation (IIa), still more preferably inequation (IIb), $$\frac{MFR \text{ (high)}}{MFR \text{ (low)}} \ge 1.1 \quad \text{(II)}$$

$$1.1 \le \frac{MFR \text{ (high)}}{MFR \text{ (low)}} \le 5.0 \quad \text{(IIa)}$$

$$1.2 \le \frac{MFR \text{ (high)}}{MFR \text{ (low)}} \le 4.0 \quad \text{(IIb)}$$

wherein

MFR (high) is the melt flow rate MFR$_2$ (230° C.) [g/10 min] of the propylene copolymer fraction with the higher melt flow rate MFR$_2$ (230° C.), MFR (low) is the melt flow rate MFR$_2$ (230° C.) [g/10 min] of the propylene copolymer fraction with the lower melt flow rate MFR$_2$ (230° C.).

Even more preferred the propylene copolymer (R-PP) comprises, preferably consists of, a first propylene copolymer fraction (R-PP1) and a second propylene copolymer fraction (R-PP2), wherein further the first propylene copolymer fraction (R-PP1) and the second propylene copolymer fraction (R-PP2) differ in the comonomer content and/or in the melt flow rate MFR$_2$ (230° C.), preferably differ in the comonomer content and in the melt flow rate MFR$_2$ (230° C.).

Thus in one embodiment the first random propylene copolymer fraction (R-PP1) has a higher comonomer content and melt flow rate MFR$_2$ (230° C.) than the second random propylene copolymer fraction (R-PP2).

In another embodiment the first random propylene copolymer fraction (R-PP1) has a higher comonomer content but a lower melt flow rate MFR$_2$ (230° C.) than the second random propylene copolymer fraction (R-PP2).

In still another embodiment the second random propylene copolymer fraction (R-PP2) has a higher comonomer content but a lower melt flow rate MFR$_2$ (230° C.) than the first random propylene copolymer fraction (R-PP1).

In yet another embodiment the second random propylene copolymer fraction (R-PP2) has a higher comonomer content and melt flow rate MFR$_2$ (230° C.) than the first random propylene copolymer fraction (R-PP1). This embodiment is especially preferred.

Accordingly it is preferred that the first random propylene copolymer fraction (R-PP1) and the second random propylene copolymer fraction (R-PP2) fulfill together the inequation (III), more preferably inequation (IIa), still more preferably inequation (IIb), $$\frac{Co \text{ } (R-PP2)}{Co \text{ } (R-PP1)} \ge 2.0, \quad \text{(III)}$$

$$2.0 \le \frac{Co \text{ } (R-PP2)}{Co \text{ } (R-PP1)} \le 10.0, \quad \text{(IIIa)}$$

$$3.0 \le \frac{Co \text{ } (R-PP2)}{Co \text{ } (R-PP1)} \le 8.0 \quad \text{(IIIb)}$$

wherein

Co(R-PP1) is the comonomer content [mol.-%] of the first propylene copolymer fraction (R-PP1), Co(R-PP2) is the comonomer content [mol.-%] of the second propylene copolymer fraction (R-PP2).

In addition or alternatively to inequation (III) the first propylene copolymer fraction (R-PP1) and the second propylene copolymer fraction (R-PP2) fulfill together the inequation (IV), more preferably inequation (IVa), still more preferably inequation (IVb), $$\frac{MFR \text{ } (R-PP2)}{MFR \text{ } (R-PP1)} \ge 1.1 \quad \text{(IV)}$$

$$1.1 \le \frac{MFR \text{ } (R-PP2)}{MFR \text{ } (R-PP1)} \le 5.0 \quad \text{(IVa)}$$

$$1.2 \le \frac{MFR \text{ } (R-PP2)}{MFR \text{ } (R-PP1)} \le 4.0 \quad \text{(IVb)}$$

wherein

MFR (R-PP1) is the melt flow rate MFR$_2$ (230° C.) [g/10 min] of the first propylene copolymer fraction (R-PP1), MFR (R-PP2) is the melt flow rate MFR$_2$ (230° C.) [g/10 min] of the second propylene copolymer fraction (R-PP2).

It is especially preferred that the propylene copolymer (R-PP) has a higher comonomer content and/or melt flow rate MFR$_2$ (230° C.) than the first random propylene copolymer fraction (R-PP1). It is in particular preferred that the propylene copolymer (R-PP) has a higher comonomer content and melt flow rate MFR$_2$ (230° C.) than the first random propylene copolymer fraction (R-PP1).

Accordingly the random propylene copolymer (R-PP) comprises, preferably consists of, the first random propylene copolymer fraction (R-PP1) and the second random propylene copolymer fraction (R-PP2), wherein further the random propylene copolymer (R-PP) fulfills (a) the inequation (V), more preferably inequation (Va), still more preferably inequation (Vb), $$\frac{Co \text{ } (R-PP)}{Co \text{ } (R-PP1)} > 1.0, \quad \text{(V)}$$

$$1.0 < \frac{Co \text{ } (R-PP)}{Co \text{ } (R-PP1)} \le 8.0, \quad \text{(Va)}$$

$$2.5 \le \frac{Co \text{ } (R-PP)}{Co \text{ } (R-PP1)} \le 7.0 \quad \text{(Vb)}$$

wherein
Co(R-PP1) is the comonomer content [mol.-%] of the first random propylene copolymer fraction (R-PP1),
Co(R-PP) is the comonomer content [mol.-%] of the propylene copolymer (R-PP),
and/or
(b) the inequation (VI), more preferably inequation (VIa), still more preferably inequation (VIb), $$\frac{MFR\ (R-PP)}{MFR\ (R-PP1)} > 1.0 \qquad (VI)$$

$$1.0 < \frac{MFR\ (R-PP)}{MFR\ (R-PP1)} \leq 3.0 \qquad (VIa)$$

$$1.0 < \frac{MFR\ (R-PP)}{MFR\ (R-PP1)} \leq 2.0 \qquad (VIb)$$

wherein
MFR (R-PP1) is the melt flow rate $MFR_2$ (230° C.) [g/10 min] of the first random propylene copolymer fraction (R-PP1),
MFR (R-PP) is the melt flow rate $MFR_2$ (230° C.) [g/10 min] of the propylene copolymer (R-PP).

Thus it is preferred that the first random propylene copolymer fraction (R-PP1) has a comonomer content of equal or below 8.0 mol-%, more preferably of equal or below 5.0 mol-%, yet more preferably in the range 0.5 to 8.0 mol-%, still more preferably in the range 0.8 to 5.0 mol-%, like in the range of 1.0 to 4.5 mol-%.

Preferably the first random propylene copolymer fraction (R-PP1) preferably has a melt flow rate $MFR_2$ (230° C.) in the range of in the range of 1.5 to 8.0 g/10 min, more preferably in the range 2.0 to 6.0 g/10 min, still more preferably in the range of 2.5 to 5.5 g/10 min.

On the other hand the second random propylene copolymer fraction (R-PP2) preferably has a comonomer content in the range of more than 8.0 to 20.0 mol-%, still more preferably in the range 10.0 to 18.0 mol-%, yet more preferably in the range 12.0 to 16.0 mol-%.

Preferably the second random propylene copolymer fraction (R-PP2) preferably has a melt flow rate $MFR_2$ (230° C.) in the range of 2.0 to 20.0 g/10 min, more preferably in the range of 3.0 to 15.0 g/10 min, still more preferably in the range of 4.0 to 10.0 g/10 min.

The comonomers of the first propylene copolymer fraction (R-PP1) and random propylene copolymer fraction (R-PP2), respectively, copolymerizable with propylene are ethylene and/or $C_4$ to $C_{12}$ α-olefins, in particular ethylene and/or $C_4$ to $C_8$ α-olefins, e.g. 1-butene and/or 1-hexene. Preferably the first propylene copolymer fraction (R-PP1) and second propylene copolymer fraction (R-PP2), respectively, comprise, especially consist of, monomers copolymerizable with propylene from the group consisting of ethylene, 1-butene and 1-hexene. More specifically the first propylene copolymer fraction (R-PP1) and second propylene copolymer fraction (R-PP2), respectively, comprise—apart from propylene—units derivable from ethylene and/or 1-butene. In a preferred embodiment the first propylene copolymer fraction (R-PP1) and the second propylene copolymer fraction (R-PP2) comprise the same comonomers, i.e. ethylene only.

Preferably the weight ratio between the first propylene copolymer fraction (R-PP1) and the second propylene copolymer fraction (R-PP2) is 20/80 to 80/20, more preferably 30/70 to 70/30, like 35/65 to 65/35.

The propylene copolymer (R-PP) as defined in the instant invention may contain up to 5.0 wt.-% additives, like α-nucleating agents and antioxidants, as well as slip agents and antiblocking agents. Preferably the additive content (without α-nucleating agents) is below 3.0 wt.-%, like below 1.0 wt.-%.

The propylene copolymer (R-PP) may comprise an α-nucleating agent. Even more preferred the present invention is free of β-nucleating agents. The α-nucleating agent, if present, is preferably selected from the group consisting of
(i) salts of monocarboxylic acids and polycarboxylic acids, e.g. sodium benzoate or aluminum tert-butylbenzoate, and
(ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and
(iii) salts of diesters of phosphoric acid, e.g. sodium 2,2'-methylenebis(4,6,-di-tert-butylphenyl)phosphate or aluminium-hydroxy-bis[2,2'-methylene-bis(4,6-di-t-butylphenyl)phosphate], and
(iv) vinylcycloalkane polymer and vinylalkane polymer (as discussed in more detail below), and
(v) mixtures thereof.

Such additives are generally commercially available and are described, for example, in "Plastic Additives Handbook", 5th edition, 2001 of Hans Zweifel.

If a α-nucleating agent is used, the propylene copolymer (R-PP) contains up to 2.0 wt.-% of the α-nucleating agent. In a preferred embodiment, the propylene copolymer (R-PP) contains not more than 2000 ppm, more preferably of 10 to 2000 ppm, more preferably of 50 to 1500 ppm of a α-nucleating agent, in particular selected from the group consisting of dibenzylidenesorbitol (e.g. 1,3:2,4 dibenzylidene sorbitol), dibenzylidenesorbitol derivative, preferably dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, vinylcycloalkane polymer, vinylalkane polymer, and mixtures thereof.

However it is especially preferred that the propylene copolymer (R-PP) and/or the blow molded article, like the extrusion blow molded article, is/are free of any α-nucleating agent.

The present invention is especially directed to a blow molded article, like an extrusion blow molded (EBM) article or an injection stretch blow molded (ISBM) article, comprising the propylene copolymer (R-PP) as defined in the instant invention.

Accordingly, the present invention is directed to a blow molded article, like extrusion blow molded (EBM) article or an injection stretch blow molded (ISBM) article, preferably comprising the propylene copolymer (R-PP) as defined above in an amount of at least 75.0 wt.-%, more preferably at least 80.0 wt.-%, still more preferably at least 90.0 wt.-%, yet more preferably at least 95.0 wt.-%, still yet more preferably comprising at least 99.0 wt.-%, based on the total weight of the blow molded article, like of the extrusion blow molded (EBM) article or of the injection stretch blow molded (ISBM) article. In one embodiment of the instant invention, the blow molded article, like the extrusion blow molded (EBM) article or the injection stretch blow molded (ISBM) article, preferably consists of the propylene copolymer (R-PP) as defined above.

The blow molded article is preferably an extrusion blow molded (EBM).

Accordingly, as the propylene copolymer (R-PP) is the main component of the blow molded article, the blow molded article, like the extrusion blow molded (EBM) article or the injection stretch blow molded (ISBM) article, has preferably the same properties as the propylene copolymer (R-PP). Accordingly, all properties mentioned for the propylene copolymer (R-PP) are equally applicable for the blow molded article, like for the extrusion blow molded (EBM) article or for the injection stretch blow molded (ISBM) article. This applies in particular, but not only, for the melt flow rate $MFR_2$ (230° C.), the comonomer content, the DSC properties, like melting temperature, and the xylene cold soluble (XCS) content.

Preferably, the extrusion blow molded articles are bottles or containers, preferably bottles for household or industrial chemicals, for cosmetics, for pharmaceutical packaging, healthcare applications or for food and drinks. In one embodiment of the instant invention, the extrusion blow molded articles are bottles suitable for healthcare applications, like blow, fill and seal applications. It is preferred that the bottles have dimensions of up to 10 l, preferably 100 ml to 5 l, like 200 ml to 2 l, and/or a wall thickness of 0.1 to 1.2 mm, like 0.2 to 0.8 mm.

In one embodiment of the present invention, the (extrusion) blow molded article has a bottle appearance factor (BAF) before sterilization of in-equation (VII), more preferably of in-equation (VIIa), yet more preferably of in-equation (VIIb), $$BAF > 180 \quad (VII),$$

$$180 < BAF \leq 500 \quad (VIIa),$$

$$300 < BAF \leq 450 \quad (VIIb)$$

wherein
BAF is defined as:

$$BAF = \frac{C \times G}{H}$$

wherein
H is the haze value
C is the clarity value,
G is the gloss value,
wherein further the haze, the clarity and the gloss are determined according to ASTM D 1003-07 on a test specimen cut from a bottle having a wall thickness of 0.3 mm made from the propylene copolymer (R-PP).

The preparation of extrusion blow molded (EBM) articles as well as of the injection stretch blow molded (ISBM) article are well known in the art and for instance described in "Propylene handbook", Nello Pasquinin (Ed.), $2^{nd}$ edition (2005), page 445, Hanser.

In extrusion blow molding (EBM), the polymer is melted and extruded into a hollow tube (a parison). This parison is then captured by closing it into a cooled forming mold. Compressed air is then blown into the parison, inflating it into the shape of the hollow bottle, container, or part. After the polymer has cooled sufficiently, the mold is opened and the part is ejected.

The present invention is also directed to the use of the propylene copolymer (R-PP) for the manufacture of a blow molded article, like of an extrusion blow molded (EBM) article or of an injection stretch blow molded (ISBM) article.

The present invention is in particular directed to the use of the propylene copolymer (R-PP) as defined above to improve the impact behavior and/or the bottle appearance factor before sterilization of an blow molded article, preferably of an extrusion blow molded (EBM) article or of an injection stretch blow molded (ISBM) article, like an extrusion blow molded bottle or extrusion blow molded container, comprising, preferably comprising at least 75.0 wt.-%, more preferably comprising at least 80.0 wt.-%, still more preferably comprising at least 90.0 wt.-%, yet more preferably comprising at least 95.0 wt.-%, still yet more preferably comprising at least 99.0 wt.-%, like consisting of, said propylene copolymer (R-PP).

The improvement is especially accomplished when the (extrusion) blow molded article, like the extrusion blow molded bottle or extrusion blow molded container preferably comprising at least 75.0 wt.-%, more preferably at least 80.0 wt.-%, still more preferably at least 90.0 wt.-%, yet more preferably at least 95.0 wt.-%, still yet more preferably at least 99.0 wt.-%, like consisting of, said propylene copolymer (R-PP) has a bottle appearance factor (BAF) before sterilization of in-equation (VII), more preferably of in-equation (VIIa), yet more preferably of in-equation (VIIb), $$BAF > 180 \quad (I),$$

$$180 < BAF \leq 500 \quad (Ia),$$

$$300 < BAF \leq 450 \quad (Ib)$$

wherein
H is the haze value
C is the clarity value,
G is the gloss value,
wherein further
the haze, the clarity and the gloss are determined according to ASTM D 1003-07 on a test specimen cut from a bottle having a wall thickness of 0.3 mm made from propylene copolymer composition (P).

The propylene copolymer (R-PP) according to this invention is preferably produced in a sequential polymerization process in the presence of a metallocene catalyst, more preferably in the presence of a catalyst (system) as defined below.

The term "sequential polymerization process" indicates that the propylene copolymer (R-PP) is produced in at least two reactors, preferably in two reactors, connected in series. Accordingly the present process comprises at least a first reactor (R1) and a second reactor (R2). The term "polymerization reactor" shall indicate that the main polymerization takes place. Thus in case the process consists of two polymerization reactors, this definition does not exclude the option that the overall process comprises for instance a pre-polymerization step in a pre-polymerization reactor. The term "consist of" is only a closing formulation in view of the main polymerization reactors.

The first reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

The second reactor (R2) is preferably a gas phase reactor (GPR). Such gas phase reactor (GPR) can be any mechanically mixed or fluid bed reactor. For example the gas phase reactor (GPR) can be a mechanically agitated fluid bed reactor with gas velocities of at least 0.2 msec. Thus it is appreciated that the gas phase reactor is a fluidized bed type reactor, optionally with a mechanical stirrer.

Thus in a preferred embodiment the first reactor (R1) is a slurry reactor (SR), like a loop reactor (LR), whereas the second reactor (R2) is a gas phase reactor (GPR). Accordingly for the instant process two polymerization reactors, namely a slurry reactor (SR), like a loop reactor (LR), and a gas phase reactor (GPR) are connected in series. If needed prior to the slurry reactor (SR) a pre-polymerization reactor is placed.

Preferably in the first reactor (R1) the first propylene copolymer fraction (R-PP1) of the propylene copolymer is produced, whereas in the second rector (R2) the second propylene copolymer fraction (R-PP2) is produced.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell described e.g. in FIG. 20 of the paper by Galli and Vecello, Prog. Polym. Sci. 26 (2001) 1287-1336.

Preferably, in the instant process for producing the propylene copolymer (R-PP) as defined above the conditions for the first reactor (R1), i.e. the slurry reactor (SR), like a loop reactor (LR), of step (a) may be as follows:
the temperature is within the range of 40° C. to 110° C., preferably between 60° C. and 100° C., like 68 to 95° C.,
the pressure is within the range of 20 bar to 80 bar, preferably between 40 bar to 70 bar,
hydrogen can be added for controlling the molar mass in a manner known per se.

Subsequently, the reaction mixture from step (a) (containing preferably the first propylene copolymer fraction (R-PP1)) is transferred to the second reactor (R2), i.e. gas phase reactor (GPR), whereby the conditions are preferably as follows:
the temperature is within the range of 50° C. to 130° C., preferably between 60° C. and 100° C.,
the pressure is within the range of 5 bar to 50 bar, preferably between 15 bar to 35 bar,
hydrogen can be added for controlling the molar mass in a manner known per se.

The residence time can vary in the two reaction zones.

In one embodiment of the process for producing the propylene copolymer (R-PP) the residence time the first reactor (R1), i.e. the slurry reactor (SR), like a loop reactor (LR), is in the range 0.2 to 4 hours, e.g. 0.3 to 1.5 hours and the residence time in the gas phase reactor (GPR) will generally be 0.2 to 6.0 hours, like 0.5 to 4.0 hours.

If desired, the polymerization may be effected in a known manner under supercritical conditions in the first reactor (R1), i.e. in the slurry reactor (SR), like in the loop reactor (LR), and/or as a condensed mode in the gas phase reactor (GPR).

The prepolymerization reaction is typically conducted at a temperature of 0 to 50° C., preferably from 10 to 45° C., and more preferably from 15 to 40° C.

The polymerization takes preferably place in the presence of a metallocene catalyst system, e.g. solid single site catalyst system, said metallocene catalyst system, e.g. said solid single site catalyst system comprises (i) a transition metal compound of formula (I)

$$R_n(Cp')_2MX_2 \qquad (I)$$

wherein
"M" is zirconium (Zr) or hafnium (Hf),
each "X" is independently a monovalent anionic σ-ligand,
each "Cp'" is a cyclopentadienyl-type organic ligand independently selected from the group consisting of substituted cyclopentadienyl, substituted indenyl, substituted tetrahydroindenyl, and substituted or unsubstituted fluorenyl, said organic ligands coordinate to the transition metal (M),
"R" is a bivalent bridging group linking said organic ligands (Cp'),
"n" is 1 or 2, preferably 1, and
(ii) optionally a cocatalyst (Co) comprising an element (E) of group 13 of the periodic table (IUPAC), preferably a cocatalyst (Co) comprising a compound of Al.

In one specific embodiment the solid single site catalyst system has a porosity measured according ASTM 4641 of less than 1.40 ml/g and/or a surface area measured according to ASTM D 3663 of lower than 25 m²/g. Preferably the solid catalyst system (SCS) has a surface area of lower than 15 m²/g, yet still lower than 10 m²/g and most preferred lower than 5 m²/g, which is the lowest measurement limit. The surface area according to this invention is measured according to ASTM D 3663 (N₂). Alternatively or additionally it is appreciated that the solid single site catalyst system has a porosity of less than 1.30 ml/g and more preferably less than 1.00 ml/g. The porosity has been measured according to ASTM 4641 (N₂). In another preferred embodiment the porosity is not detectable when determined with the method applied according to ASTM 4641 (N2).

Furthermore the solid single site catalyst system typically has a mean particle size of not more than 500 μm, i.e. preferably in the range of 2 to 500 μm, more preferably 5 to 200 μm.

It is in particular preferred that the mean particle size is below 80 μm, still more preferably below 70 μm. A preferred range for the mean particle size is 5 to 70 μm, or even 10 to 60 μm.

As stated above the transition metal (M) is zirconium (Zr) or hafnium (Hf), preferably zirconium (Zr).

The term "σ-ligand" is understood in the whole description in a known manner, i.e. a group bound to the metal via a sigma bond. Thus the anionic ligands "X" can independently be halogen or be selected from the group consisting of R', OR', SiR'₃, OSiR'₃, OSO₂CF₃, OCOR', SR', NR'₂ or PR'₂ group wherein R' is independently hydrogen, a linear or branched, cyclic or acyclic, $C_1$-$C_{20}$-alkyl, $C_2$-$C_{20}$-alkenyl, $C_2$-$C_{20}$-alkynyl, $C_3$-$C_{12}$-cycloalkyl, $C_6$-$C_{20}$-aryl, $C_7$-$C_{20}$-arylalkyl, $C_7$-$C_{20}$-alkylaryl, $C_8$-$C_{20}$-arylalkenyl, in which the R' group can optionally contain one or more heteroatoms belonging to groups 14 to 16. In a preferred embodiments the anionic ligands "X" are identical and either halogen, like Cl, or methyl or benzyl.

A preferred monovalent anionic ligand is halogen, in particular chlorine (Cl). The substituted cyclopentadienyl-type ligand(s) may have one or more substituent(s) being selected from the group consisting of halogen, hydrocarbyl (e.g. $C_1$-$C_{20}$-alkyl, $C_2$-$C_{20}$-alkenyl, $C_2$-$C_{20}$-alkynyl, $C_3$-$C_{20}$-cycloalkyl, like $C_1$-$C_{20}$-alkyl substituted $C_5$-$C_{20}$-cycloalkyl, $C_6$-$C_{20}$-aryl, $C_5$-$C_{20}$-cycloalkyl substituted $C_1$-$C_{20}$-alkyl wherein the cycloalkyl residue is substituted by $C_1$-$C_{20}$-alkyl, $C_7$-$C_{20}$-arylalkyl, $C_3$-$C_{12}$-cycloalkyl which contains 1, 2, 3 or 4 heteroatom(s) in the ring moiety, $C_6$-$C_{20}$-heteroaryl, $C_1$-$C_{20}$-haloalkyl, —SiR"₃, —SR", —PR"₂ or —NR″$_2$, each R″ is independently a hydrogen or hydrocarbyl (e.g. C$_1$-C$_{20}$-alkyl, C$_1$-C$_{20}$ alkenyl, C$_2$-C$_{20}$-alkynyl, C$_3$-C$_{12}$-cycloalkyl, or C$_6$-C$_{20}$-aryl) or e.g. in case of —NR″$_2$, the two substituents R″ can form a ring, e.g. five- or six-membered ring, together with the nitrogen atom where they are attached to.

Further "R" of formula (I) is preferably a bridge of 1 to 4 atoms, such atoms being independently carbon (C), silicon (Si), germanium (Ge) or oxygen (O) atom(s), whereby each of the bridge atoms may bear independently substituents, such as C$_1$-C$_{20}$-hydrocarbyl, tri(C$_1$-C$_{20}$-alkyl)silyl, tri(C$_1$-C$_{20}$-alkyl)siloxy and more preferably "R" is a one atom bridge like e.g. —SiR‴$_2$—, wherein each R‴ is independently C$_1$-C$_{20}$-alkyl, C$_2$-C$_{20}$-alkenyl, C$_2$-C$_{20}$-alkynyl, C$_3$-C$_{12}$-cycloalkyl, C$_6$-C$_{20}$-aryl, alkylaryl or arylalkyl, or tri(C$_1$-C$_{20}$-alkyl)silyl-residue, such as trimethylsilyl-, or the two R‴ can be part of a ring system including the Si bridging atom.

In a preferred embodiment the transition metal compound has the formula (II)

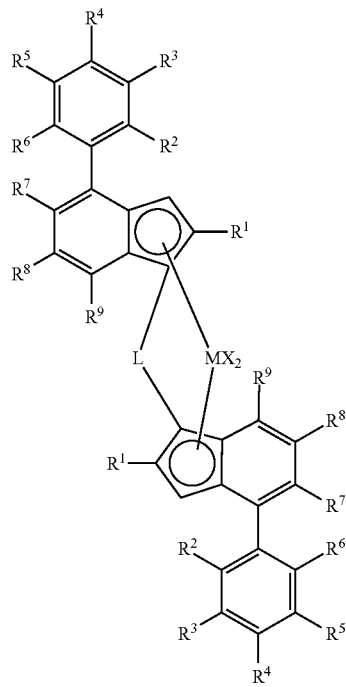

wherein

M is zirconium (Zr) or hafnium (Hf), preferably zirconium (Zr),

X are ligands with a σ-bond to the metal "M", preferably those as defined above for formula (I), preferably chlorine (Cl) or methyl (CH$_3$), the former especially preferred, R$^1$ are equal to or different from each other, and are selected from the group consisting of linear saturated C$_1$-C$_{20}$-alkyl, linear unsaturated C$_1$-C$_{20}$-alkyl, branched saturated C$_1$-C$_{20}$ alkyl, branched unsaturated C$_1$-C$_{20}$-alkyl, C$_3$-C$_{20}$ cycloalkyl, C$_6$-C$_{20}$ aryl, C$_7$-C$_{20}$ alkylaryl, and C$_7$-C$_{20}$ arylalkyl, optionally containing one or more heteroatoms of groups 14 to 16 of the Periodic Table (IUPAC), preferably they are equal to each other, and are C$_1$-C$_{10}$ linear or branched hydrocarbyl, more preferably are equal to each other, and are C$_1$-C$_6$ linear or branched alkyl, R$^2$ to R$^6$ are equal to or different from each other and are selected from the group consisting of hydrogen, linear saturated C$_1$-C$_{20}$-alkyl, linear unsaturated C$_1$-C$_{20}$-alkyl, branched saturated C$_1$-C$_{20}$-alkyl, branched unsaturated C$_1$-C$_{20}$-alkyl, C$_3$-C$_{20}$-cycloalkyl, C$_6$-C$_{20}$-aryl, C$_7$-C$_{20}$-alkylaryl, and C$_7$-C$_{20}$-arylalkyl, optionally containing one or more heteroatoms of groups 14 to 16 of the Periodic Table (IUPAC), preferably are equal to each other and are C$_1$-C$_{10}$ linear or branched hydrocarbyl, more preferably are C$_1$-C$_6$ linear or branched alkyl, R$^7$ and R$^8$ are equal to or different from each other and selected from the group consisting of hydrogen, linear saturated C$_1$-C$_{20}$-alkyl, linear unsaturated C$_1$-C$_{20}$-alkyl, branched saturated C$_1$-C$_{20}$-alkyl, branched unsaturated C$_1$-C$_{20}$ alkyl, C$_3$-C$_{20}$-cycloalkyl, C$_6$-C$_{20}$ aryl, C$_7$-C$_{20}$ alkylaryl, C$_7$-C$_{20}$ arylalkyl, optionally containing one or more heteroatoms of groups 14 to 16 of the Periodic Table (IUPAC), SiR$^{10}$$_3$, GeR$^{10}$$_3$, OR$^{10}$, SR$^{10}$ and NR$^{10}$$_2$, wherein R$^{10}$ is selected from the group consisting of linear saturated C$_1$-C$_{20}$-alkyl, linear unsaturated C$_1$-C$_{20}$-alkyl, branched saturated C$_1$-C$_{20}$-alkyl, branched unsaturated C$_1$-C$_{20}$-alkyl, C$_3$-C$_{20}$ cycloalkyl, C$_6$-C$_{20}$-aryl, C$_7$-C$_{20}$-alkylaryl, and C$_7$-C$_{20}$-arylalkyl, optionally containing one or more heteroatoms of groups 14 to 16 of the Periodic Table (IUPAC), and/or R$^7$ and R$^8$ being optionally part of a C$_4$-C$_{20}$-carbon ring system together with the indenyl carbons to which they are attached, preferably a C$_5$ ring, optionally one carbon atom can be substituted by a nitrogen, sulfur or oxygen atom, R$^9$ are equal to or different from each other and are selected from the group consisting of hydrogen, linear saturated C$_1$-C$_{20}$-alkyl, linear unsaturated C$_1$-C$_{20}$-alkyl, branched saturated C$_1$-C$_{20}$-alkyl, branched unsaturated C$_1$-C$_{20}$-alkyl, C$_3$-C$_{20}$ cycloalkyl, C$_6$-C$_{20}$-aryl, C$_7$-C$_{20}$-alkylaryl, C$_7$-C$_{20}$-arylalkyl, OR$^{10}$, and SR$^{10}$, wherein R$^{10}$ is defined as before, preferably R$^9$ are equal to or different from each other and are H or CH$_3$, most preferably R$^9$ are both H.

L is a bivalent group bridging the two indenyl ligands, preferably being a C$_2$R$^{11}$$_4$ unit or a SiR$^{11}$$_2$ or GeR$^{11}$$_2$, wherein, R$^{11}$ is selected from the group consisting of H, linear saturated C$_1$-C$_{20}$-alkyl, linear unsaturated C$_1$-C$_{20}$-alkyl, branched saturated C$_1$-C$_{20}$-alkyl, branched unsaturated C$_1$-C$_{20}$-alkyl, C$_3$-C$_{20}$-cycloalkyl, C$_6$-C$_{20}$-aryl, C$_7$-C$_{20}$-alkylaryl or C$_7$-C$_{20}$-arylalkyl, optionally containing one or more heteroatoms of groups 14 to 16 of the Periodic Table (IUPAC), preferably Si(CH$_3$)$_2$, SiCH$_3$C$_6$H$_{11}$, or SiPh$_2$, wherein C$_6$H$_{11}$ is cyclohexyl.

Preferably the transition metal compound of formula (II) is C$_2$-symmetric or pseudo-C$_2$-symmetric. Concerning the definition of symmetry it is referred to Resconi et al. Chemical Reviews, 2000, Vol. 100, No. 4 1263 and references cited therein.

Preferably the residues R$^1$ are equal to or different from each other, more preferably equal, and are selected from the group consisting of linear saturated C$_1$-C$_{10}$-alkyl, linear unsaturated C$_1$-C$_{10}$-alkyl, branched saturated C$_1$-C$_{10}$-alkyl, branched unsaturated C$_1$-C$_{10}$-alkyl and C$_7$-C$_{12}$-arylalkyl. Even more preferably the residues R$^1$ are equal to or different from each other, more preferably equal, and are selected from the group consisting of linear saturated C$_1$-C$_6$-alkyl, linear unsaturated C$_1$-C$_6$-alkyl, branched saturated C$_1$-C$_6$-alkyl, branched unsaturated C$_1$-C$_6$-alkyl and C$_7$-C$_{10}$-arylalkyl. Yet more preferably the residues R$^1$ are equal to or different from each other, more preferably equal, and are selected from the group consisting of linear or branched $C_1$-$C_4$-hydrocarbyl, such as for example methyl or ethyl.

Preferably the residues $R^2$ to $R^6$ are equal to or different from each other and linear saturated $C_1$-$C_4$-alkyl or branched saturated $C_1$-$C_4$-alkyl. Even more preferably the residues $R^2$ to $R^6$ are equal to or different from each other, more preferably equal, and are selected from the group consisting of methyl, ethyl, iso-propyl and tert-butyl.

Preferably $R^7$ and $R^8$ are equal to or different from each other and are selected from hydrogen and methyl, or they are part of a 5-carbon ring including the two indenyl ring carbons to which they are attached. In another preferred embodiment, $R^7$ is selected from $OCH_3$ and $OC_2H_5$, and $R^8$ is tert-butyl.

In a preferred embodiment the transition metal compound is rac-methyl(cyclohexyl)silanediylbis(2-methyl-4-(4-tert-butylphenyl)indenyl)zirconium dichloride.

In a second preferred embodiment, the transition metal compound is rac-dimethylsilanediyl bis(2-methyl-4-phenyl-1,5,6,7-tetrahydro-s-indacen-1-yl)zirconium dichloride.

In a third preferred embodiment, the transition metal compound is rac-dimethylsilanediyl bis(2-methyl-4-phenyl-5-methoxy-6-tert-butylindenyl)zirconium dichloride.

As a further requirement the solid single site catalyst system according to this invention may comprise a cocatalyst (Co) comprising an element (E) of group 13 of the periodic table (IUPAC), for instance the cocatalyst (Co) comprises a compound of Al. Examples of such cocatalyst (Co) are organo aluminium compounds, such as aluminoxane compounds.

Such compounds of Al, preferably aluminoxanes, can be used as the only compound in the cocatalyst (Co) or together with other cocatalyst compound(s). Thus besides or in addition to the compounds of Al, i.e. the aluminoxanes, other cation complex forming cocatalyst compounds, like boron compounds can be used. Said cocatalysts are commercially available or can be prepared according to the prior art literature. Preferably however in the manufacture of the solid catalyst system only compounds of Al as cocatalyst (Co) are employed.

In particular preferred cocatalysts (Co) are the aluminoxanes, in particular the $C_1$ to $C_{10}$-alkylaluminoxanes, most particularly methylaluminoxane (MAO).

Preferably, the organo-zirconium compound of formula (I) and the cocatalyst (Co) of the solid single site catalyst system represent at least 70 wt %, more preferably at least 80 wt %, even more preferably at least 90 wt %, even further preferably at least 95 wt % of the solid catalyst system.

Thus it is appreciated that the solid single site catalyst system is featured by the fact that it is self-supported, i.e. it does not comprise any catalytically inert support material, like for instance silica, alumina or $MgCl_2$, which is otherwise commonly used in heterogeneous catalyst systems, i.e. the catalyst is not supported on external support or carrier material. As a consequence of that the solid single site catalyst system is self-supported and it has a rather low surface area.

In one embodiment the solid single site catalyst system is obtained by the emulsion/solidification technology, the basic principles of which are described in WO 03/051934. This document is herewith included in its entirety by reference.

Hence the solid single site catalyst system is preferably in the form of solid catalyst particles, obtainable by a process comprising the steps of a) preparing a solution of one or more catalyst components;
b) dispersing said solution in a second solvent to form an emulsion in which said one or more catalyst components are present in the droplets of the dispersed phase,
c) solidifying said dispersed phase to convert said droplets to solid particles and optionally recovering said particles to obtain said catalyst.

Preferably a first solvent, more preferably a first organic solvent, is used to form said solution. Still more preferably the organic solvent is selected from the group consisting of a linear alkane, cyclic alkane, aromatic hydrocarbon and halogen-containing hydrocarbon.

Moreover the second solvent forming the continuous phase is an inert solvent towards to catalyst components. The second solvent might be immiscible towards the solution of the catalyst components at least under the conditions (like temperature) during the dispersing step. The term "immiscible with the catalyst solution" means that the second solvent (continuous phase) is fully immiscible or partly immiscible i.e. not fully miscible with the dispersed phase solution.

Preferably the immiscible solvent comprises a fluorinated organic solvent and/or a functionalized derivative thereof, still more preferably the immiscible solvent comprises a semi-, highly- or perfluorinated hydrocarbon and/or a functionalized derivative thereof. It is in particular preferred, that said immiscible solvent comprises a perfluorohydrocarbon or a functionalized derivative thereof, preferably $C_3$-$C_{30}$-perfluoroalkanes, -alkenes or -cycloalkanes, more preferred $C_4$-$C_{10}$-perfluoro-alkanes, -alkenes or -cycloalkanes, particularly preferred perfluorohexane, perfluoroheptane, perfluorooctane or perfluoro (methylcyclohexane) or perfluoro (1,3-dimethylcyclohexane) or a mixture thereof. Furthermore it is preferred that the emulsion comprising said continuous phase and said dispersed phase is a bi- or multiphasic system as known in the art. An emulsifier may be used for forming and stabilising the emulsion. After the formation of the emulsion system, said catalyst is formed in situ from catalyst components in said solution.

In principle, the emulsifying agent may be any suitable agent which contributes to the formation and/or stabilization of the emulsion and which does not have any adverse effect on the catalytic activity of the catalyst. The emulsifying agent may e.g. be a surfactant based on hydrocarbons optionally interrupted with (a) heteroatom(s), preferably halogenated hydrocarbons optionally having a functional group, preferably semi-, highly- or perfluorinated hydrocarbons as known in the art. Alternatively, the emulsifying agent may be prepared during the emulsion preparation, e.g. by reacting a surfactant precursor with a compound of the catalyst solution. Said surfactant precursor may be a halogenated hydrocarbon with at least one functional group, e.g. a highly fluorinated $C_1$-$C_n$ (suitably $C_4$-$C_{30}$ or $C_5$-$C_{15}$) alcohol (e.g. highly fluorinated heptanol, octanol or nonanol), oxide (e.g. propenoxide) or acrylate ester which reacts e.g. with a cocatalyst component, such as aluminoxane to form the "actual" surfactant.

In principle any solidification method can be used for forming the solid particles from the dispersed droplets. According to one preferable embodiment the solidification is effected by a temperature change treatment. Hence the emulsion subjected to gradual temperature change of up to 10° C./min, preferably 0.5 to 6° C./min and more preferably 1 to 5° C./min.

Even more preferred the emulsion is subjected to a temperature change of more than 40° C., preferably more than 50° C. within less than 10 seconds, preferably less than 6 seconds.

For further details, embodiments and examples of the continuous and dispersed phase system, emulsion formation method, emulsifying agent and solidification methods reference is made e.g. to the above cited international patent application WO 03/051934.

All or part of the preparation steps can be done in a continuous manner Reference is made to WO 2006/069733 describing principles of such a continuous or semi-continuous preparation methods of the solid catalyst types, prepared via emulsion/solidification method.

The above described catalyst components are prepared according to the methods described in WO 01/48034.

In the following, the present invention is described by way of examples.

EXAMPLES

A. Measuring Methods

The following definitions of terms and determination methods apply for the above general description of the invention as well as to the below examples unless otherwise defined.

Quantification of Microstructure by NMR Spectroscopy

Quantitative nuclear-magnetic resonance (NMR) spectroscopy was used to quantify the comonomer content of the polymers.

Quantitative $^{13}$C {$^{1}$H} NMR spectra were recorded in the solution-state using a Bruker Advance III 400 NMR spectrometer operating at 400.15 and 100.62 MHz for $^{1}$H and $^{13}$C respectively. All spectra were recorded using a $^{13}$C optimised 10 mm extended temperature probehead at 125° C. using nitrogen gas for all pneumatics. Approximately 200 mg of material was dissolved in 3 ml of 1,2-tetrachloroethane-d$_2$ (TCE-d$_2$) along with chromium-(III)-acetylacetonate (Cr(acac)$_3$) resulting in a 65 mM solution of relaxation agent in solvent as described in G. Singh, A. Kothari, V. Gupta, Polymer Testing 2009, 28(5), 475.

To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme as described in Z. Zhou, R. Kuemmerle, X. Qiu, D. Redwine, R. Cong, A. Taha, D. Baugh, B. Winniford, J. Mag. Reson. 187 (2007) 225 and V. Busico, P. Carbonniere, R. Cipullo, C. Pellecchia, J. Severn, G. Talarico, Macromol. Rapid Commun. 2007, 28, 1128. A total of 6144 (6k) transients were acquired per spectra. Quantitative $^{13}$C {$^{1}$H} NMR spectra were processed, integrated and relevant quantitative properties determined from the integrals. All chemical shifts were indirectly referenced to the central methylene group of the ethylene block (EEE) at 30.00 ppm using the chemical shift of the solvent. This approach allowed comparable referencing even when this structural unit was not present.

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

Characteristic signals corresponding to the incorporation of ethylene were observed (as described in Cheng, H. N., Macromolecules 1984, 17, 1950) and the comonomer fraction calculated as the fraction of ethylene in the polymer with respect to all monomer in the polymer.

The comonomer fraction was quantified using the method of W-J. Wang and S. Zhu, Macromolecules 2000, 33 1157, through integration of multiple signals across the whole spectral region in the $^{13}$C {$^{1}$H} spectra. This method was chosen for its robust nature and ability to account for the presence of regio-defects when needed. Integral regions were slightly adjusted to increase applicability across the whole range of encountered comonomer contents.

The mole percent comonomer incorporation was calculated from the mole fraction. The weight percent comonomer incorporation was calculated from the mole fraction. Calculation of comonomer content of the second propylene copolymer fraction (R-PP2):

$$\frac{C(PP) - w(PP1) \times C(PP1)}{w(PP2)} = C(PP2)$$

wherein
w(PP1) is the weight fraction [in wt.-%] of the first propylene copolymer fraction (R-PP1),
w(PP2) is the weight fraction [in wt.-%] of second propylene copolymer fraction (R-PP2),
C(PP1) is the comonomer content [in mol-%] of the first random propylene copolymer fraction (R-PP1),
C(PP) is the comonomer content [in mol-%] of the random propylene copolymer (R-PP),
C(PP2) is the calculated comonomer content [in mol-%] of the second random propylene copolymer fraction (R-PP2).

Melt Flow Rate (MFR)

The melt flow rates are measured with a load of 2.16 kg (MFR$_2$) at 230° C. The melt flow rate is that quantity of polymer in grams which the test apparatus standardised to ISO 1133 extrudes within 10 minutes at a temperature of 230° C. under a load of 2.16 kg.

Calculation of melt flow rate MFR$_2$ (230° C.) of the second propylene copolymer fraction (R-PP2):

$$MFR(PP2) = 10^{\left[\frac{\log(MFR(PP)) - w(PP1) \times \log(MFR(PP1))}{w(PP2)}\right]}$$

wherein
w(PP1) is the weight fraction [in wt.-%] of the first propylene copolymer fraction (R-PP1),
w(PP2) is the weight fraction [in wt.-%] of second propylene copolymer fraction (R-PP2),
MFR(PP1) is the melt flow rate MFR$_2$ (230° C.) [in g/10 min] of the first propylene copolymer fraction (R-PP1),
MFR(PP) is the melt flow rate MFR$_2$ (230° C.) [in g/10 min] of the propylene copolymer (R-PP), MFR(PP2) is the calculated melt flow rate MFR$_2$ (230° C.) [in g/10 min] of the second propylene copolymer fraction (R-PP2).

The xylene solubles (XCS, wt.-%): Content of xylene cold solubles (XCS) is determined at 25° C. according ISO 16152; first edition; 2005-07-01

Calculation of the xylene cold soluble (XCS) content of the second propylene copolymer fraction (R-PP2):

$$\frac{XS(PP) - w(PP1) \times XS(PP1)}{w(PP2)} = XS(PP2)$$

wherein w(PP1) is the weight fraction [in wt.-%] of the first propylene copolymer fraction (R-PP1), w(PP2) is the weight fraction [in wt.-%] of the second propylene copolymer fraction (R-PP2), XS(PP1) is the xylene cold soluble (XCS) content [in wt.-%] of the first propylene copolymer fraction (R-PP1), XS(PP) is the xylene cold soluble (XCS) content [in wt.-%] of the propylene copolymer (R-PP), XS(PP2) is the calculated xylene cold soluble (XCS) content [in wt.-%] of the second propylene copolymer fraction (R-PP2).

Hexane Solubles

FDA section 177.1520

1 g of a polymer film of 100 μm thickness is added to 400 ml hexane at 50° C. for 2 hours while stirring with a reflux cooler.

After 2 hours the mixture is immediately filtered on a filter paper No 41.

The precipitate is collected in an aluminium recipient and the residual hexane is evaporated on a steam bath under $N_2$ flow.

The amount of hexane solubles is determined by the formula ((wt. sample+wt. crucible)−(wt. crucible))/(wt. sample)·100.

Melting temperature ($T_m$) and heat of fusion ($H_f$), crystallization temperature ($T_c$) and heat of crystallization ($H_e$): measured with Mettler TA820 differential scanning calorimetry (DSC) on 5 to 10 mg samples. DSC is run according to ISO 3146/part 3/method C2 in a heat/cool/heat cycle with a scan rate of 10° C./min in the temperature range of +23 to +210° C. Crystallization temperature and heat of crystallization ($H_e$) are determined from the cooling step, while melting temperature and heat of fusion ($H_f$) are determined from the second heating step The glass transition temperature Tg is determined by dynamic mechanical analysis according to ISO 6721-7. The measurements are done in torsion mode on compression moulded samples (40×10×1 mm³) between −100° C. and +150° C. with a heating rate of 2° C./min and a frequency of 1 Hz.

Number average molecular weight ($M_n$), weight average molecular weight ($M_w$) and polydispersity (Mw/Mn) are determined by Gel Permeation Chromatography (GPC) according to the following method:

The weight average molecular weight Mw and the polydispersity (Mw/Mn), wherein Mn is the number average molecular weight and Mw is the weight average molecular weight) is measured by a method based on ISO 16014-1:2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl-4-methylphenol) as solvent at 145° C. and at a constant flow rate of 1 mL/min. 216.5 μL of sample solution were injected per analysis. The column set was calibrated using relative calibration with 19 narrow MWD polystyrene (PS) standards in the range of 0.5 kg/mol to 11 500 kg/mol and a set of well characterized broad polypropylene standards. All samples were prepared by dissolving 5-10 mg of polymer in 10 mL (at 160° C.) of stabilized TCB (same as mobile phase) and keeping for 3 hours with continuous shaking prior sampling in into the GPC instrument.

Rheology: Dynamic rheological measurements were carried out with Rheometrics RDA-II QC on compression moulded samples under nitrogen atmosphere at 200° C. using 25 mm—diameter plate and plate geometry. The oscillatory shear experiments were done within the linear viscoelastic range of strain at frequencies from 0.01 to 500 rad/s. (ISO 6721-10)

The values of storage modulus (G'), loss modulus (G"), complex modulus (G*) and complex viscosity (η*) were obtained as a function of frequency (ω).

The Zero shear viscosity ($\eta_0$) was calculated using complex fluidity defined as the reciprocal of complex viscosity. Its real and imaginary part are thus defined by $f'(\omega) = \eta'(\omega)/[\eta'(\omega)^2 + \eta''(\omega)^2]$ and $f''(\omega) = \eta''(\omega)/[\eta'(\omega)^2 + \eta''(\omega)^2]$ From the following equations $\eta' = G''/\omega$ and $\eta'' = G'/\omega$ $f'(\omega) = G''(\omega) \cdot \omega/[G'(\omega)^2 + G''(\omega)^2]$ $f''(\omega) = G'(\omega) \cdot \omega/[G'(\omega)^2 + G''(\omega)^2]$ The polydispersity index, PI, PI = $10^5/G_c$, is calculated from the cross-over point of G'(ω) and G"(ω), for which G'($\omega_c$) = G"($\omega_c$) = $G_c$ holds.

Porosity (of the catalyst): BET with $N_2$ gas, ASTM 4641, apparatus Micromeritics Tristar 3000; sample preparation: at a temperature of 50° C., 6 hours in vacuum.

Surface area (of the catalyst): BET with $N_2$ gas ASTM D 3663, apparatus Micromeritics Tristar 3000: sample preparation at a temperature of 50° C., 6 hours in vacuum.

Flexural Modulus: The flexural modulus was determined in 3-point-bending at 23° C. according to ISO 178 on 80×10×4 mm³ test bars injection moulded in line with EN ISO 1873-2

Description/Dimension and Production of the Bottles:

1 l bottles, having an outer diameter of 90 mm, a wall thickness of 0.3 or 0.6 mm, an overall-height of 204 mm and a height of the cylindrical mantle of 185 mm were produced by extrusion blow molding on a B&W machine with a single screw extruder using a melt temperature of 210° C. and a mold temperature of 15° C., if not otherwise indicated.

Transparency, Clarity, and Haze Measurement on Bottles:

Instrument: Haze-gard plus from BYK-Gardner

Testing: according to ASTM D1003 (as for injection molded plates)

Method: The measurement is done on the outer wall of the bottles. The top and bottom of the bottles are cut off. The resulting round wall is then split in two, horizontally. Then from this wall six equal samples of app. 60×60 mm are cut from close to the middle. The specimens are placed into the instrument with their convex side facing the haze port. Then the transparency, haze and clarity are measured for each of the six samples and the haze value is reported as the average of these six parallels.

Gloss Measurement on Bottles:

Instrument: Screen TRI-MICROGLOSS 20-60-80 from BYK-Gardner 20

Testing: ASTM D 2457 (as for injection molded plates)

The bottles: It is measured on the wall of the bottles. The top and bottom of the bottles is cut off. This round wall is then split in two, horizontally. Then this wall is cut into six equal 25 samples of app. 90×90 mm, just to fit into a special light trap made for testing on injection molded parts. Then the gloss at 20° is measured on these six samples, and the average value is reported as gloss at 20°.

Drop Test on Bottles

The drop test is performed on the extrusion blow molded 1 l bottles as described before according to ASTM D2463-10b, procedure B The bottles are filled up to their shoulder with water.

During a pre-test the estimated falling height is determined on 10 bottles.

The final test is to be performed on 20 bottles, starting at the pre-determined falling height.

For each run 2 bottles are dropped.

Depending on 2 breaks or 1 break/1 no-break (=neutral) or 2 no-breaks, the next dropping height is chosen to be lower/same/higher for the next round.

The increase or decrease in height is 0.25 m, only at dropping heights <1.5 m the increase or decrease is 0.1 m.

The final drop height is determined depending on the falling heights of the containers after the first change in trend or after the first "neutral" result according following formula:

$$he = \Sigma(ni \cdot hi)/ng$$

wherein
he=50% drop height
hi=drop height
ni=number of containers dropped at the respective height
ng=total number of dropped containers B. Examples The catalyst used for inventive example IE1 is described in example 10 of WO 2010/052263 A1. The catalyst used in the polymerization process for comparative example CE1 is described in example 1 of EP 1 741 725 A1.

TABLE 1

Preparation of the example IE1 and CE1

|  |  | IE1 | CE1 |
|---|---|---|---|
| Catalyst |  |  |  |
| Temperature | (° C.) | 20 | 20.8 |
| Residence time | (h) | 0.33 | 0.31 |
| Loop |  |  |  |
| Temperature | (° C.) | 70 | 65 |
| H2/C3 ratio | [mol/kmol] | 0.1 | 0.01 |
| C6/C3 ratio | [mol/kmol] | — | 9.1 |
| C2/C3 ratio | [mol/kmol] | 10.6 | — |
| MFR$_2$ | [g/10 min] | 4.5 | 0.7 |
| C6 | [mol-%] | — | 0.7 |
| C2 | [mol-%] | 2.2 | — |
| XCS | [wt.-%] | 1.4 | 2.5 |
| GPR |  |  |  |
| Temperature | (° C.) | 75 | 85 |
| H2/C3 ratio | [mol/kmol] | 0.3 | 0.5 |
| C6/C3 ratio | [mol/kmol] | — | 0.4 |
| C2/C3 ratio | [mol/kmol] | 282 | — |
| MFR$_2$ of copo B | [g/10 min] | 5.8 | 5.8 |
| C6 of copo B | [mol-%] | — | 2.6 |
| C2 of copo B | [mol-%] | 12.8 | — |
| XCS of copo B | [wt.-%] | 51 | 1.1 |
| Split Loop/GPR | [%] | 51/49 | 46/54 |

Loop defines the first propylene copolymer fraction (R-PP1)
GPR defines the second propylene copolymer fraction (R-PP2)

CE2 is the commercial grade LE6609-PH available from Borealis AG, Austria and is a low density polyethylene having a density of 930 kg/m³ and a MFR$_2$ (190° C./2.16 kg) of 0.3 g/10 min.

CE3 is the commercial grade Purell SM170G available from LyondellBasell Industries Holdings B.V. and is a SSC propylene-ethylene random copolymer having a density of 900 kg/m³ and a MFR$_2$ (230° C.) of 1.5 g/10 min.

CE4 is the commercial grade RB801CF-01 available from Borealis AG, Austria and is a ZN propylene-ethylene random copolymer having a melting temperature of 140° C. and a MFR$_2$ (230° C.) of 1.9 g/10 min.

CE5 is the commercial grade RB206MO available from Borealis AG, Austria and is a ZN propylene-ethylene random copolymer having a melting temperature of 148° C. and a MFR$_2$ (230° C.) of 1.9 g/10 min.

TABLE 2

Properties of the example IE1 and the comperative examples CE1 to CE5

|  |  | IE1 | CE1 | CE2 | CE3 | CE4 | CE5 |
|---|---|---|---|---|---|---|---|
| Nucleation | [—] | No | no | no | no | no | No |
| Comonomer content | [mol-%] | 7.4 | 1.7 | — | 7.0 | 7.0 | 4.4 |
| Comonomer type | [—] | (C2) | (C6) | — | (C2) | (C2) | (C2) |
| MFR$_2$ | [g/10 min] | 5.1 | 2.2 | 0.3** | 1.5 | 1.9 | 1.9 |
| C6 solubles | [wt.-%] | 3.7 | 1.5 | <5 | 0.8 | 1.5 |  |
| XCS | [wt.-%] | 26 | 1.7 |  |  |  |  |
| Mw | kg/mol | 216 | 265 |  |  |  |  |
| MWD | [—] | 2.9 | 2.8 |  |  |  |  |
| Tm | [° C.] | 136.2 | 137.3 |  |  | 140 | 148 |
| Tc | [° C.] | 100.6 | 95.6 |  |  |  |  |
| Tg | [° C.] | −7 |  |  |  |  |  |
| 2,1 | [%] | 0.6 | 0.6 |  |  |  |  |
| Tensile modulus | [MPa] | 557 | 774* | 420 | 605 | 791 | 1150 |

*Flexural modulus
**MFR$_2$ measured at 190° C.

The examples IE1 and CE1 to CE5 were used in an EBM process.

Table 3 shows the EBM bottle production data and the performance of the produced bottles.

TABLE 3

EBM bottle production data and properties

|  |  | IE 1 | CE1 | CE2 | CE4 | CE5 |
|---|---|---|---|---|---|---|
| EBM bottle wall thickness | [mm] | 0.6 | 0.6 | 0.6 | 0.6 | 0.6 |
| Melt temperature | [° C.] | 177 | 178 | 198 | 197 | 197 |
| Screw speed | [1/min] | 15.6 | 15.0 | 16.0 | 13.2 | 15.8 |
| Die pressure | [bar] | 60 | 81 | 73 | 72 | 73 |
| Drop height | [m] | 2.53 | 4.55 | 5.50 | 3.48 | 1.11 |
| Gloss | [%] | 21 | 17 | na | na | 19.7 |
| Clarity | [%] | 71 | 67 | 89 | 67 | 79.2 |
| Haze | [%] | 25 | 36 | 34 | 47 | 26 |
| BAF | [—] | 58 | 31 | na | na | 60 |
| EBM bottle wall thickness | [mm] | 0.3 | 0.3 | 0.3 | 0.3 | 0.3 |
| Melt temperature | [° C.] | 176 | 177 | 196 | 196 | 197 |
| Screw speed | [1/min] | 9.9 | 10.7 | 11.1 | 9.9 | 10.0 |
| Die pressure | [bar] | 66 | 83 | 91 | 71 | 83 |
| Gloss | [%] | 59.0 | 33.7 | 30.3 | 32.5 | 18.5 |
| Clarity | [%] | 89.5 | 77.8 | 88.9 | 89.2 | 73.3 |
| Haze | [%] | 14.5 | 21.7 | 23.7 | 17.9 | 17.6 |
| BAF | [—] | 364 | 121 | 114 | 162 | 77 |

BAF Bottle Appearance Factor (BAF = Gloss * Clarity/Haze)

The invention claimed is:

1. Blow molded article comprising at least 75.0 wt. % based on the total weight of the blow molded article, of a propylene copolymer (R-PP), wherein the blow molded article and/or the propylene copolymer (R-PP) has/have:
   (a) a melt flow rate $MFR_2$ (230° C.) measured according to ISO 1133 in the range of more than 2.0 to 12.0 g/10 min,
   (b) a comonomer content in the range of 4.0 to below 14.0 mol. %,
   (c) a melting temperature in the range of 125 to below 143° C., and
   (d) a xylene cold soluble fraction (XCS) in the range of above 15.0 to 40.0 wt. %.

2. Blow molded article according to claim 1, wherein the comonomer of the propylene copolymer (R-PP) is selected from ethylene, $C_4$ to $C_{12}$ α-olefin, and mixtures thereof.

3. Blow molded article according to claim 1, wherein said propylene copolymer (R-PP) has:
   (a) a glass transition temperature in the range of −12° C. to +2° C.; and/or
   (b) no glass transition temperature below −20° C.

4. Blow molded article according to claim 1, wherein said propylene copolymer (R-PP) has:
   (a) a molecular weight distribution (Mw/Mn) of at least 2.7; and/or
   (b) a polydispersity index (PI) of at least 2.3.

5. Blow molded article according claim 1, wherein said propylene copolymer (R-PP):
   (a) has 2,1 regio-defects of at least 0.2% determined by $^{13}$C-NMR spectroscopy; and/or
   (b) is monophasic.

6. Blow molded article according to claim 1, wherein the blow molded article comprises said propylene copolymer (R-PP) in an amount of at least 80.0 wt. %, based on the total weight of the blow molded article.

7. Blow molded article according to claim 1, wherein the blow molded article has a bottle appearance factor (BAF) before sterilization of in-equation (I):

$$BAF > 180 \tag{I}$$

wherein:
BAF is defined as:

$$BAF = \frac{C \times G}{R}$$

wherein:
H is the haze value,
C is the clarity value,
G is the gloss value,
wherein further the haze, the clarity and the gloss are determined according to ASTM D 1003-07 on a test specimen cut from a bottle having a wall thickness of 0.3 mm made from said propylene copolymer (R-PP).

8. Blow molded article according to claim 1, wherein said propylene copolymer (R-PP) comprises two fractions, a first propylene copolymer fraction (R-PP1) and a second propylene copolymer fraction (R-PP2), said first propylene copolymer fraction (R-PP1) differs from said second propylene copolymer fraction (R-PP2) in the melt flow rate $MFR_2$ (230° C.) and/or in the comonomer content.

9. Blow molded article according to claim 8, wherein
   (a) the weight ratio between the first propylene copolymer fraction (R-PP1) and the second propylene copolymer fraction (R-PP2) [(R-PP1):(R-PP2)] is 70:30 to 30:70; and/or
   (b) the comonomers for the first propylene copolymer fraction (R-PP1) and the second propylene copolymer fraction (R-PP2) are selected from ethylene, $C_4$ to $C_{12}$ α-olefin, and mixtures thereof.

10. Blow molded article according to claim 8, wherein:
    (a) the first propylene copolymer fraction (R-PP1) is the comonomer lean fraction and the second propylene copolymer fraction (R-PP2) is the comonomer rich fraction; and/or,
    (b) the first propylene copolymer fraction (R-PP1) has a lower melt flow rate $MFR_2$ (230° C.) than the second propylene copolymer fraction (R-PP2).

11. Blow molded article according to claims 8, wherein:
    (a) the first propylene copolymer fraction (R-PP1) has a lower comonomer content than the propylene copolymer (R-PP); and/or,
    (b) the first propylene copolymer fraction (R-PP1) has a lower melt flow rate $MFR_2$ (230° C.) than the propylene copolymer (R-PP).

12. Blow molded article according to claim 8, wherein
    (a) the first propylene copolymer fraction (R-PP1) has a comonomer content in the range of 0.5 to 8.0 mol % based on the first propylene copolymer fraction (R-PP1); and/or,
    (b) the second propylene copolymer fraction (R-PP2) has a comonomer content in the range of more than 8.0 to 20.0 mol % based on the second propylene copolymer fraction (R-PP2).

13. Blow molded article according to claim 8, wherein:
    (a) the first propylene copolymer fraction (R-PP1) has a melt flow rate $MFR_2$ (230° C.) in the range of 1.5 to 8.0 g/10 min; and/or,
    (b) the second propylene copolymer fraction (R-PP2) has a melt flow rate $MFR_2$ (230° C.) in the range of more than 2.0 to 20.0 g/10 min.

14. Blow molded article according to claim 8, wherein:
    (a) the first random propylene copolymer fraction (R-PP1) and the second random propylene copolymer fraction (R-PP2) fulfill together the inequation (IV):

$$\frac{MFR(R-PP2)}{MFR(R-PP1)} \geq 1.1 \tag{IV}$$

wherein:
MFR (R-PP1) is the melt flow rate $MFR_2$ (230° C.) [g/10 min] of the first propylene copolymer fraction (R-PP1),
MFR (R-PP2) is the melt flow rate $MFR_2$ (230° C.) [g/10 min] of the second propylene copolymer fraction (R-PP2); and/or,
    (b) the first random propylene copolymer fraction (R-PP1) and the random propylene copolymer fraction (R-PP) fulfill together the inequation (VI):

$$\frac{MFR(R-PP)}{MFR(R-PP1)} > 1.0 \tag{VI}$$

wherein:
MFR (R-PP1) is the melt flow rate $MFR_2$ (230° C.) [g/10 min] of the first propylene copolymer fraction (R-PP1), MFR (R-PP) is the melt flow rate MFR$_2$ (230° C.) [g/10 min] of the propylene copolymer fraction (R-PP).

15. Blow molded article according to claim 8, wherein:
(a) the first random propylene copolymer fraction (R-PP1) and the second random propylene copolymer fraction (R-PP2) fulfill together the inequation (III):

$$\frac{Co(R-PP2)}{Co(R-PP1)} \geq 2.0; \tag{III}$$

wherein:
Co (R-PP1) is the comonomer content [mol. %] of the first propylene copolymer fraction (R-PP1),
Co (R-PP2) is the comonomer content [mol. %] of the second propylene copolymer fraction (R-PP2), and/or,
(b) the first random propylene copolymer fraction (R-PP1) and the random propylene copolymer fraction (R-PP) fulfill together the inequation (V):

$$\frac{Co(R-PP)}{Co(R-PP1)} > 1.0 \tag{V}$$

wherein:
Co (R-PP1) is the comonomer content [mol. %] of the first propylene copolymer fraction (R-PP1),
Co (R-PP) is the comonomer content [mol. %] of the propylene copolymer fraction (R-PP).

16. Blow molded article according to claim 1, wherein the blow molded article is an extrusion blow molded article.

17. Extrusion blow molded article according to claim 16, wherein the extrusion blow molded article is a bottle or a container.

\* \* \* \* \*